US012330324B2

(12) United States Patent
Zhang

(10) Patent No.: US 12,330,324 B2
(45) Date of Patent: Jun. 17, 2025

(54) FOLDING KNIFE CONTAINING BLADE REPLACEMENT STRUCTURE

(71) Applicant: Huan Zhang, Nanjing (CN)

(72) Inventor: Huan Zhang, Nanjing (CN)

( * ) Notice: Subject to any disclaimer, the term of this patent is extended or adjusted under 35 U.S.C. 154(b) by 327 days.

(21) Appl. No.: 17/897,554

(22) Filed: Aug. 29, 2022

(65) Prior Publication Data

US 2024/0017432 A1 Jan. 18, 2024

(30) Foreign Application Priority Data

Jul. 13, 2022 (CN) ......................... 202210827530.8

(51) Int. Cl.
*B26B 5/00* (2006.01)

(52) U.S. Cl.
CPC ..................................... *B26B 5/00* (2013.01)

(58) Field of Classification Search
CPC .... B26B 1/00; B26B 1/02; B26B 3/00; B26B 5/00; B26B 5/003; B26B 5/005; B26B 5/006; B26B 5/007
USPC .......................................................... 30/156
See application file for complete search history.

(56) References Cited

U.S. PATENT DOCUMENTS 1,064,652 A * 6/1913 James ..................... B26B 5/006 30/332
1,774,680 A * 9/1930 Thomas .................. B26B 5/006 30/336
1,813,723 A * 7/1931 Beaver ....................... B26B 5/00 30/162
2,213,292 A * 9/1940 Testi ......................... B26B 1/02 30/156
2,523,575 A * 9/1950 Kassel .................... B26B 5/006 30/156
2,628,423 A * 2/1953 Cuntz ..................... B26B 5/006 30/156
3,058,215 A * 10/1962 Williams .................. B26B 5/00 30/317
3,965,575 A * 6/1976 Stunger ..................... B26B 5/00 30/294
4,011,657 A * 3/1977 Vance ....................... B26B 5/00 30/337
4,073,057 A * 2/1978 Gilbert ...................... B26B 5/00 30/157
4,169,312 A * 10/1979 Mar .......................... B26B 5/00 30/337
4,425,709 A * 1/1984 Quenzi ..................... B26B 5/00 30/151

(Continued)

*Primary Examiner* — Jason Daniel Prone
(74) *Attorney, Agent, or Firm* — Dority & Manning, P.A.

(57) ABSTRACT

The present invention provides a folding knife containing a blade replacement structure, including a handle body (1), a blade holder (2), a blade (3), and a connection pin (4). The blade holder (2) includes a first clamp plate (21), a second clamp plate (22), a spacer (23), and an elastic member (221). The first clamp plate (21), the second clamp plate (22), and the spacer (23) together enclose an embedding slot that allows the blade to be inserted. When the folding knife is completely opened, a first slot (31) on the blade (3) fits with a first locking protrusion (231) on the spacer (23), and a second slot (32) on the blade (3) fits with a second locking protrusion on the elastic member (221). The blade holder (2) and the blade (3) can rotate around the connection pin (4) to be accommodated in the handle body (1).

4 Claims, 4 Drawing Sheets

(56) References Cited

U.S. PATENT DOCUMENTS

| | | | | | |
|---|---|---|---|---|---|
| 5,022,156 | A * | 6/1991 | Kallens | B26B 5/00 30/337 |
| 5,027,512 | A * | 7/1991 | Andrews | B26B 5/00 30/169 |
| 5,689,889 | A * | 11/1997 | Overholt | B26B 5/00 30/329 |
| 6,058,611 | A * | 5/2000 | Rickard | B26B 5/00 30/340 |
| 6,263,581 | B1 * | 7/2001 | Forte | B26B 5/00 30/329 |
| 6,321,455 | B1 * | 11/2001 | Burchell | B26B 5/00 30/340 |
| 6,574,868 | B1 * | 6/2003 | Overholt | B26B 5/00 30/329 |
| 6,701,626 | B2 * | 3/2004 | Knoop | B26B 5/00 30/337 |
| 7,020,969 | B2 * | 4/2006 | Roberson | B26B 5/00 30/152 |
| 7,900,363 | B1 * | 3/2011 | White | B26B 5/00 30/340 |
| 8,914,982 | B1 * | 12/2014 | Skluzak | B26B 5/00 30/337 |
| 8,978,254 | B1 * | 3/2015 | White | B26B 5/00 30/340 |
| 9,630,328 | B2 * | 4/2017 | Koenig | B26B 1/02 |
| 10,493,641 | B2 * | 12/2019 | Bloch | B26B 5/00 |
| 11,090,820 | B1 * | 8/2021 | Wu | B26B 5/00 |
| 11,370,132 | B2 * | 6/2022 | Tsai | B26B 5/00 |
| 11,618,174 | B2 * | 4/2023 | Kao | B26B 5/00 30/156 |
| 11,642,801 | B1 * | 5/2023 | Dovel | B26B 5/00 30/162 |
| 11,707,858 | B1 * | 7/2023 | Mon | B26B 5/006 30/156 |
| 11,820,033 | B2 * | 11/2023 | Marshall | B26B 5/00 |
| 11,969,909 | B2 * | 4/2024 | Dovel | B26B 5/003 |
| 12,030,204 | B1 * | 7/2024 | Lazenby | B26B 5/00 |
| 12,076,875 | B2 * | 9/2024 | Tsai | B26B 5/00 |
| 2005/0278955 | A1 * | 12/2005 | Lee | B26B 5/00 30/153 |
| 2010/0018060 | A1 * | 1/2010 | Lin | B26B 5/00 30/151 |
| 2017/0266821 | A1 * | 9/2017 | Cheng | B26B 5/00 |
| 2020/0331159 | A1 * | 10/2020 | Yoo | B26B 5/006 |
| 2023/0405852 | A1 * | 12/2023 | Douglas | B26B 5/00 |
| 2024/0017430 | A1 * | 1/2024 | Yeh | B26B 5/006 |
| 2024/0066724 | A1 * | 2/2024 | Wu | B26B 5/00 |
| 2024/0100723 | A1 * | 3/2024 | Germann | B26B 5/00 |
| 2024/0100724 | A1 * | 3/2024 | Germann | B26B 5/00 |

* cited by examiner

FOLDING KNIFE CONTAINING BLADE REPLACEMENT STRUCTURE

FIELD OF THE INVENTION

This application relates to the technical field of cutting tools, and in particular, to a folding knife containing a blade replacement structure.

BACKGROUND OF THE INVENTION

The Chinese patent with granted publication No. CN209665439U discloses a cutter head of a folding utility knife, including a blade carrier and a blade. The blade carrier is formed by an upper cover and a base that are connected in a butting way. A blade change locking knob is disposed in a locking knob hole disposed at the upper cover of the blade carrier. A first spring plate slot is disposed on the base of the blade carrier. An arch-shaped spring plate is disposed in the first spring plate slot. A top surface of the spring plate elastically abuts against a bottom surface of the blade change locking knob. Due to elastic force, two convex lug locking blocks disposed on a lower surface of an open groove on the blade change locking knob are placed in two blade locking slots at an upper portion of the blade. The blade is locked and is positioned in a blade cavity of the blade carrier. When a new blade is replaced for the cutter head, locking connections between the two convex lug locking blocks and the two blade locking slots at the upper portion of the blade can be broken by pressing the blade change locking knob.

The blade of the cutter head of the foregoing folding utility knife is convenient for change. However, the folding utility knife also has disadvantages. For example, the blade used therefor is a trapezoidal blade commonly used in the industry. Such blade is relatively thin and is low in strength; and is mainly used for cutting paper and cutting sealing tape of a package. Such cutter head is not suitable for cutting objects, such as cutting fruits and cutting hard objects in the daily life of people. Therefore, the folding utility knife is greatly limited.

SUMMARY OF THE INVENTION

Objectives of the present invention are to resolve the foregoing technical problems; and to provide a blade suitable for cutting hard objects, such as cutting fruits in the daily life of people, and provide a blade replacement structure convenient for blade replacement and a folding knife including the blade replacement structure.

The present invention is implemented through the following technical solutions.

The present invention provides a blade replacement structure, including a blade and a blade holder. The blade holder includes a first clamp plate, a second clamp plate, a spacer, and a first elastic member. The spacer is disposed between the first clamp plate and the second clamp plate. The first clamp plate, the second clamp plate, and the spacer together enclose a blade embedding slot that allows the blade to be inserted. A side of the spacer close to a blade tip is provided with a first locking protrusion that extends forwards. A side of the blade opposite to a knife-edge portion is provided with an avoidance opening for avoiding the spacer. An edge of the avoidance opening is provided with a first slot that fits with the first locking protrusion at a position corresponding to the first locking protrusion. A side of the blade embedding slot close to the knife-edge portion is provided with a lower limiting wall. When the blade is completely inserted into the blade embedding slot, the lower limiting wall abuts against a side of the blade that is away from the blade tip but close to the knife-edge portion. The spacer is provided with an avoidance slot at a position corresponding to the first elastic member. The first elastic member includes a first end and a second end. The first end of the first elastic member is fixedly connected to the second clamp plate. The second end is disposed in the blade embedding slot, and is fixedly connected with a press-mode switch that can be operated from external of the blade holder. A side of the first elastic member facing a same direction with the knife-edge portion is provided with a second locking protrusion that extends downwards. The edge of the avoidance opening is provided with a second slot that fits with the second locking protrusion at a position corresponding to the second locking protrusion.

Optionally, the spacer is integrally formed with the second clamp plate; and the first end of the first elastic member is fixedly connected to the second clamp plate by a connection pin.

Optionally, the press-mode switch is cylinder shaped; the first clamp plate is provided with an avoidance hole at a position corresponding to the press-mode switch; and the press-mode switch extends through the avoidance hole to outside of the first clamp plate.

Optionally, the spacer and the second clamp plate are separate structures; and the first end of the first elastic member is integrally connected to the second clamp plate.

Optionally, another edge of the first elastic member is separated from the second clamp plate by a slot penetrating the second clamp plate.

Optionally, a curved portion is disposed at the first end of the first elastic member; and relative to second clamp plate, the second end of the first elastic member is lifted towards a direction of the blade.

Optionally, an end face of the first locking protrusion at a side close to the blade is configured to be an arc-shaped end face; and a shape of the edge of the avoidance opening of the blade is configured to fit with a shape of an outer edge of the spacer.

The present invention further provides a folding knife, including a handle body and the blade replacement structure described above. A side of the blade holder away from the blade tip is provided with a connection hole. The handle body is pivotally connected to the blade holder by the connection pin. The handle body is provided with an accommodation slot. The blade holder can rotate relative to the handle body by the connection pin as a rotating shaft, to be folded and accommodated in the accommodation slot.

Optionally, the handle body is provided with a limiting pin at a position that is on a side opposite to the knife-edge portion and close to the connection pin; an edge of a side that is of the blade holder and is away from the blade tip is provided with a first limiting slot and a second limiting slot; the first limiting slot abuts against the limiting pin when the blade is completely opened; and the second limiting slot abuts against the limiting pin when the blade is completely closed.

Optionally, a second elastic member is disposed at a position on a slot wall at one side of the accommodation slot; when the blade holder is at a position at which the same is completely opened, the second elastic member is so configured that a side thereof that is close to the blade tip can abut against a rear edge of the blade holder, to keep the blade holder completely opened.

The folding knife containing a blade replacement structure provided in this application has the following advantages.

1. A connection between the blade and the blade holder is very stable and reliable. When the blade needs to be replaced, restriction on displacement of the blade in a front-rear direction can be released merely by pressing the press-mode switch to disengage the second locking protrusion from the second slot. An operation of replacing the blade is also very convenient.
2. A blade with a large size has higher requirements on strength of the blade holder. To be specific, both the second clamp plate and the spacer need to have a considerable thickness to ensure strength. The first elastic member has an independent structure, and elasticity thereof may not be limited by the thickness of the second clamp plate. In this way, the problem about the strength of the blade holder when a relatively large blade is assembled is resolved.
3. The first elastic member integrally formed with the second clamp plate is provided with a curved portion at the first end, thereby improving elasticity of the first elastic member. In this way, a technical problem that elasticity of the first elastic member is insufficient due to excessively high hardness is resolved.
4. On a premise of ensuring that the connection between the blade holder and the blade has sufficient strength, the thickness of the blade holder can be made thinner, thereby saving materials and reducing costs. The blade holder is more suitable for assembling small-sized blades, such as small-sized blades for fruits.

LIST OF REFERENCE NUMERALS IN THE FIGURES

Figure 1:
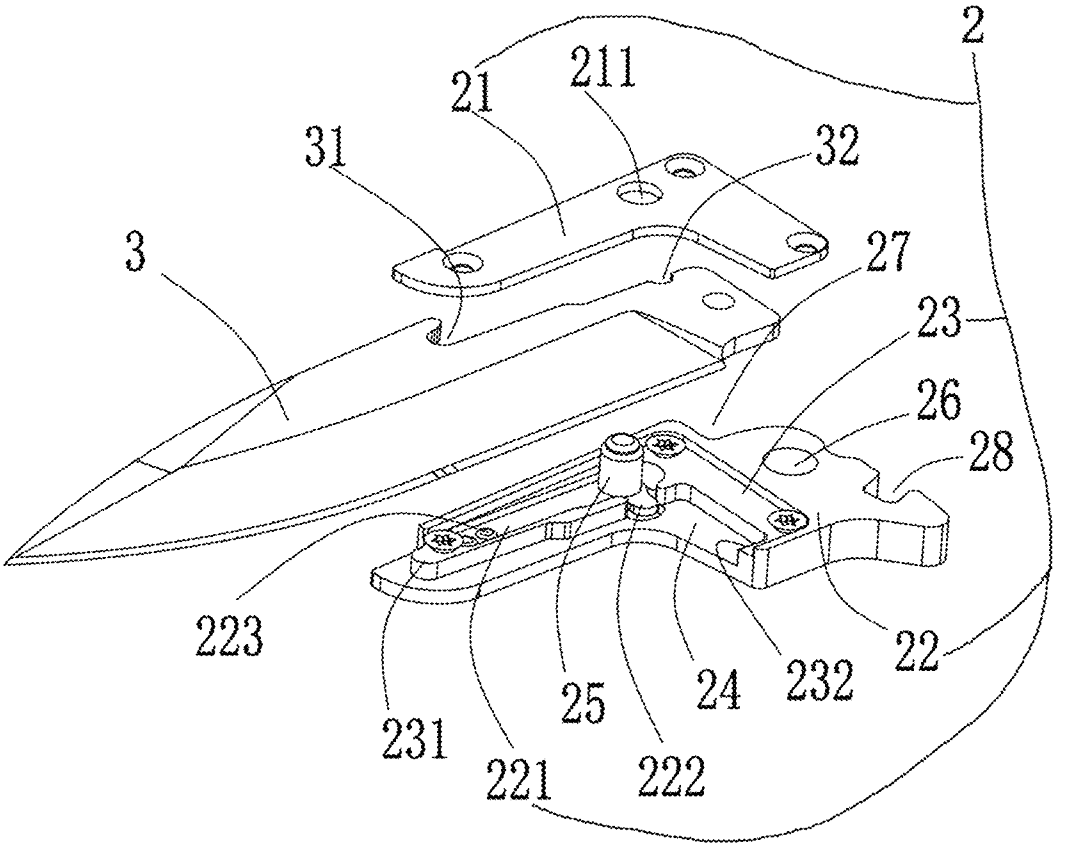
FIG. 1 is an exploded schematic structural diagram of a blade and a blade holder according to Embodiment 1 of the present invention.

1 handle body
2 blade holder
21 first clamp plate
211 avoidance hole
22 second clamp plate
221 first elastic member
222 second locking protrusion
223 connection pin
23 spacer
231 first locking protrusion
232 lower limiting wall
24 blade embedding slot
25 press-mode switch
26 connection hole
27 first limiting slot
28 second limiting slot
3 blade
31 first slot
32 second slot
4 connection pin

DETAILED DESCRIPTION OF THE EMBODIMENTS

To make objectives, technical solutions, and advantages of this application more clear, the present invention is further described below with reference to the accompanying drawings. The accompanying drawings are merely for illustrative purposes, and should not be construed as limitation to this patent.

To describe the embodiments more briefly, some parts and components known to a person skilled in the art but not related to the main content of the present invention may be omitted in the accompanying drawings or the descriptions. In addition, for the convenience of description, some parts and components in the accompanying drawings may be omitted, scaled up, or scaled down; but this does not represent a size or an overall structure of an actual product.

In the description of the embodiments, the terms "up", "down", "left", and "right" and other orientations or positional relationships are based on the orientations or positional relationship shown in the accompanying drawings, and are only for convenience of description and for simplifying operations, rather than being intended to indicate or imply that a device or an element referred to must have a particular orientation or be constructed and operate in a particular orientation. Therefore, these should not be construed as limitation to the present invention. In addition, the terms "first" and "second" are merely used for distinction in description, and have no special meaning.

Embodiment 1

Figure 2:
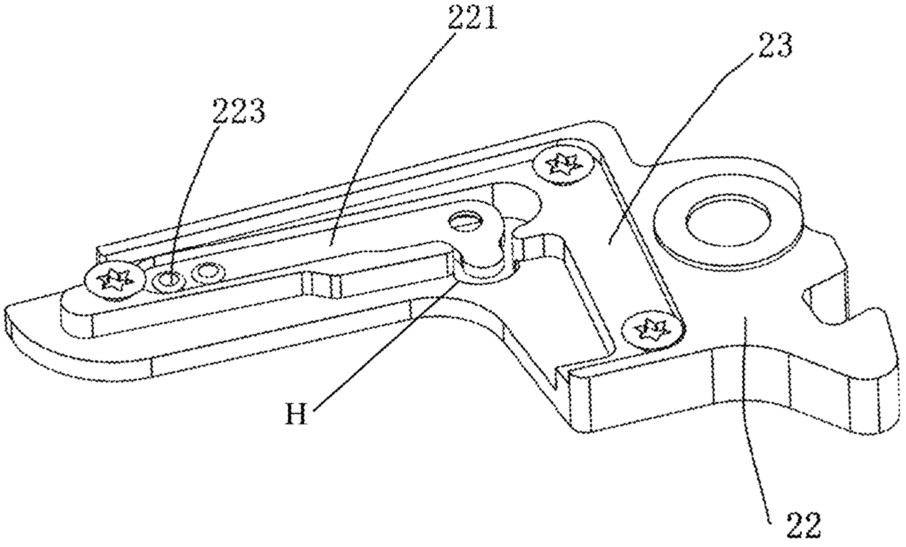
FIG. 2 is a schematic structural diagram of a blade holder, a spacer, and a first elastic member according to Embodiment 1 of the present invention.
Figure 3:
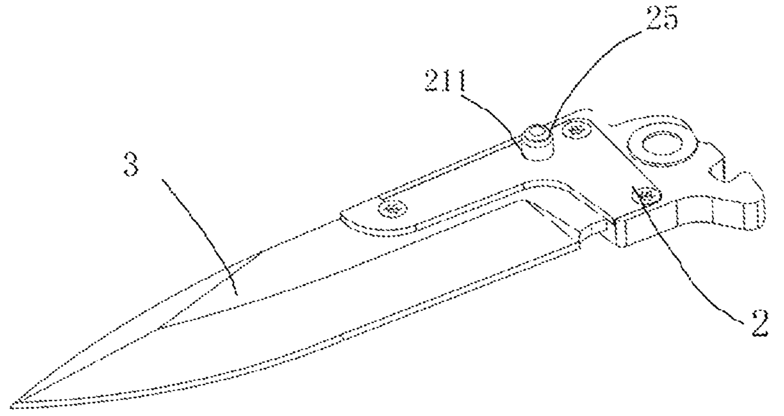
FIG. 3 is a schematic structural diagram of a blade holder and a press-mode switch according to Embodiment 1 of the present invention.

As shown in FIG. 1 to FIG. 3, this embodiment provides a blade replacement structure, including a blade 3 and a blade holder 2. The blade 3 includes a knife-edge portion and a back portion opposite to the knife-edge portion. The blade holder 2 includes a first clamp plate 21, a second clamp plate 22, a spacer 23, and a first elastic member 221. The spacer 23 is fixedly disposed on the second clamp plate 22. The first clamp plate 21 engages the second clamp plate 22 so that the spacer 23 is positioned between the first clamp plate 21 and the second clamp plate 22. The first clamp plate 21, the second clamp plate 22, and the spacer 23 together enclose a blade embedding slot 24 that allows the blade 3 to be inserted. Thus, a top wall of the blade embedding slot 24 is defined by the first clamp plate 21, a bottom wall of the blade embedding slot 24 is defined by the second clamp plate 22, and a side wall of the blade embedding slot 24 is defined by the spacer 23. A side of the spacer 23 close to a blade tip is provided with a first locking protrusion 231. A side of the blade 3 opposite to a knife-edge portion and close to the blade tip is provided with a first slot 31 that fits with the first locking protrusion 231. When the blade 3 is completely inserted into the blade embedding slot 24, the first locking protrusion is latched into the first slot. A side of the spacer 23 far away from the blade tip is provided with a lower limiting wall 232. The lower limiting wall 232 abuts against a side of the blade 3 away from the blade tip but close to the knife-edge portion, i.e., abuts against a rear portion of the blade 3, to restrict the rear portion of the blade from moving downwards. The spacer 23 is provided with an avoidance slot at a position corresponding to the first elastic member 221. The first elastic member 221 includes a first end and a second end. The first end of the first elastic member 221 is fixedly connected to the second clamp plate 22. When the first elastic member is in a natural state, the second end of the first elastic member 221 is disposed in the blade embedding slot 24. The second end is fixedly connected with a press-mode switch 25. At this second end, a side of the first elastic member 221 facing a same direction with the knife-edge portion is provided with a second locking protrusion 222. A side of the blade 3 opposite to the knife-edge portion and away from the blade tip is provided with a second slot 32 that fits with the second locking protrusion 222. A recess H is formed in the second clamp plate 22, at a position corresponding to the second locking protrusion 222. The recess H is in communication with the avoidance slot so as to provide a space to receive the second locking protrusion 222 when the press-mode switch 25 is pressed down. In the foregoing technical solution, after the blade 3 is completely inserted into the blade embedding slot 24, the fitting between the first locking protrusion 231 and the first slot 31 can restrict a front portion of the blade 3 from moving up and down. The lower limiting wall 232 disposed at a rear portion of the blade embedding slot 24 can restrict a rear portion of the blade 3 from moving up and down. In this case, the second locking protrusion 222 is automatically latched into the second slot 32 under elastic force of the first elastic member 221, so that the blade 3 cannot move back and forth at this time. In this way, locking of the blade 3 in an up-down direction and a front-rear direction is implemented, and the blade 3 is connected and fixed to the holder of the blade 3. Moreover, the blade 3 is restricted in the up-down and front-rear directions, and the connection between the blade 3 and the blade holder 2 is also very stable and reliable. Among which the front direction is direction extending (for example from the first locking protrusion 231) towards the blade tip, and the rear direction is a direction opposite to the front direction. When the blade needs to be replaced, restriction on the displacement of the blade in the front-rear direction can be released merely by pressing the press-mode switch to disengage the second locking protrusion from the second slot. The blade can be replaced at this time only, and an operation of replacing the blade is also very convenient. Specifically, when the blade needs to be replaced, a user pushes down the switch 25, so that the second locking protrusion 222 correspondingly moves downwardly, gets out of second slot 32 (i.e., disengages from the second slot 32) and into the recess H. Such a push operation may be realized by a simple press-down operation on the switch 25.

Optionally, in this embodiment, the spacer 23 is integrally formed with the second clamp plate 22; and the first end of the first elastic member is fixedly connected to the second clamp plate by a connection pin 223. The integrated design can improve structural strength, so as to achieve more stable clamping of the blade and reduce a possibility of displacement or falling off of the blade during use. During matching of a blade with a large size, there are higher requirements on strength of the blade holder. To be specific, both the second clamp plate and the spacer need to have a considerable thickness to ensure strength. The first elastic member has an independent structure, and elasticity thereof may not be limited by the thickness of the second clamp plate. According to this technical solution, the problem about the strength of the blade holder when a relatively large blade is assembled is resolved.

Optionally, the press-mode switch 25 is cylinder shaped; the first clamp plate 21 is provided with an avoidance hole 211 at a position corresponding to the press-mode switch 25; and the press-mode switch 25 extends through the avoidance hole 211 to outside of the first clamp plate 21. Operation difficulty in replacing the blade is reduced by means that the press-mode switch extends through the avoidance hole to the outside of the clamp plate. Thus, the structure is more ergonomic. During use, the blade can be replaced when the folding knife is opened or is accommodated.

Embodiment 2

Figure 4:
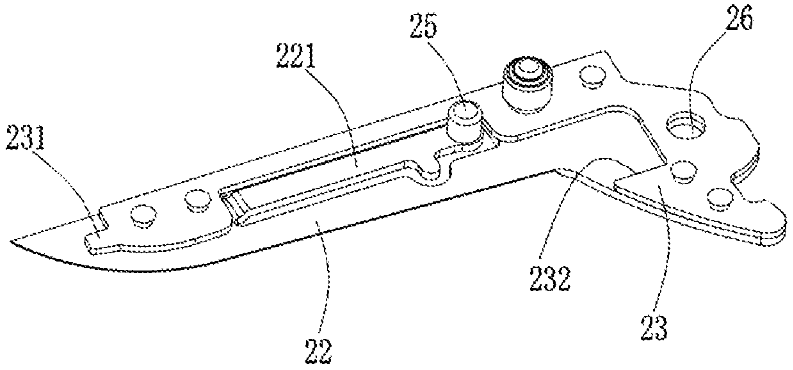
FIG. 4 is a schematic structural diagram of a blade holder, a spacer, and a first elastic member according to Embodiment 2 of the present invention.
Figure 5:
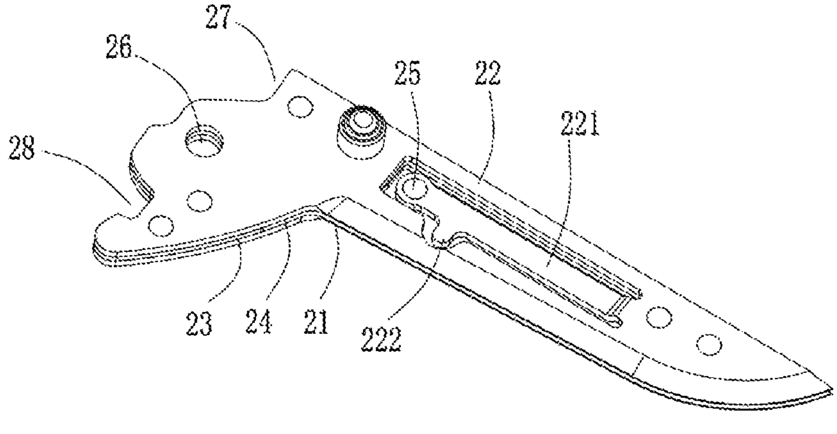
FIG. 5 is a schematic structural diagram of a first elastic member and a second clamp plate according to Embodiment 2 of the present invention.
Figure 6:
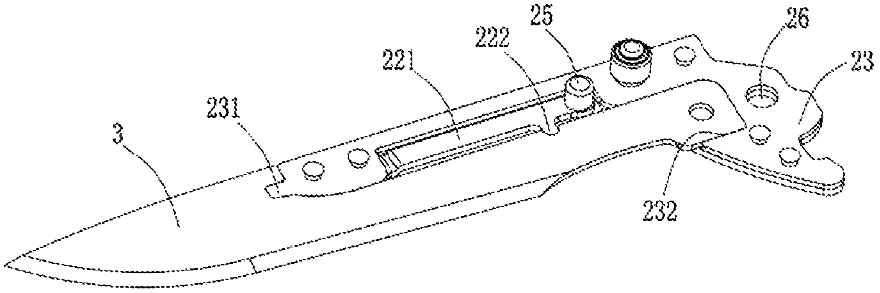
FIG. 6 is a schematic structural diagram of fitting between a blade and a first elastic member and a holder according to Embodiment 2 of the present invention.
Figure 7:
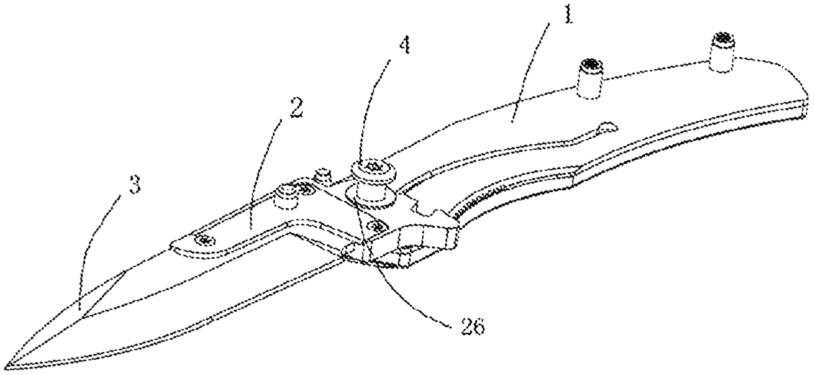
FIG. 7 is a schematic diagram of a structure in which an upper cover of a handle body is omitted when a blade of a folding knife is completely opened according to Embodiment 3 of the present invention.
Figure 8:
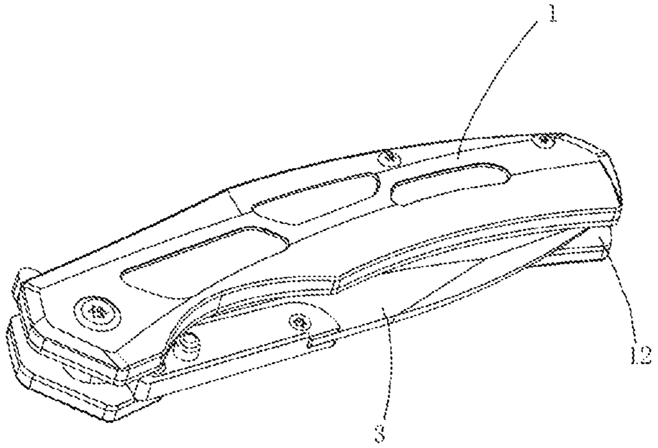
FIG. 8 is a schematic diagram illustrating that a blade of a folding knife is accommodated in an accommodation slot of a handle body according to Embodiment 3 of the present invention.
Figure 9:
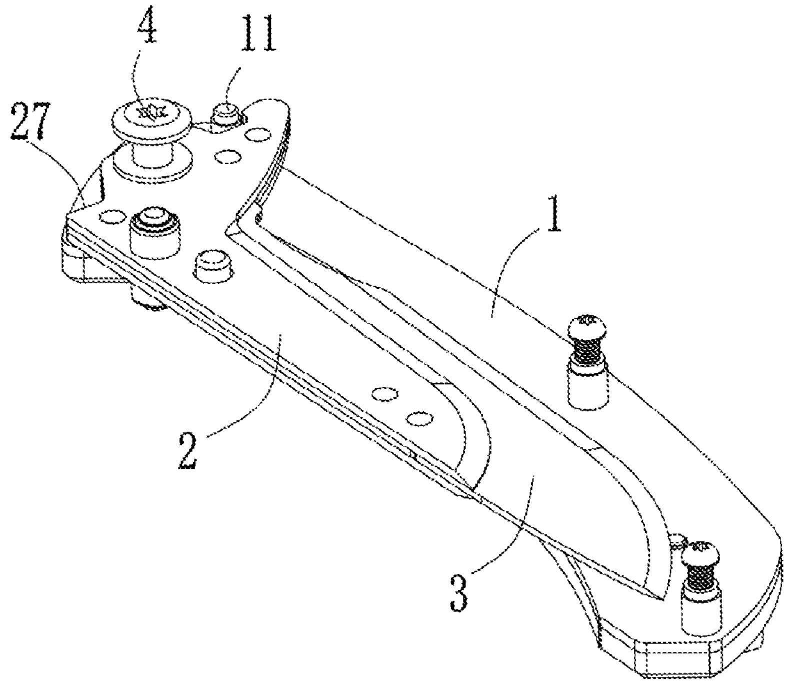
FIG. 9 is a schematic diagram of fitting between a first limiting slot and a limiting pin of a handle body when a blade of a folding knife is closed according to Embodiment 3 of the present invention.
Figure 10:
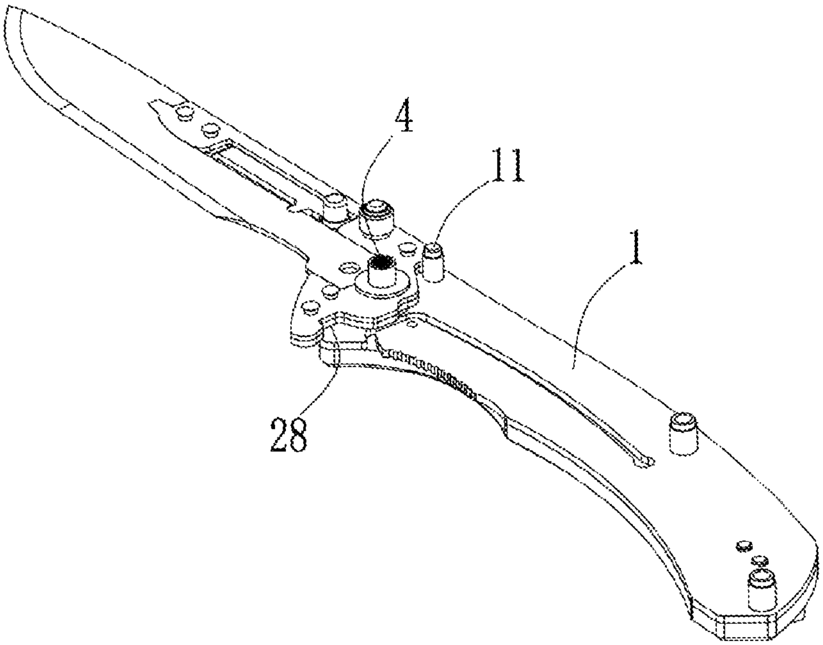
FIG. 10 is a schematic diagram of fitting between a second limiting slot and a limiting pin of a handle body when a blade of a folding knife is opened according to Embodiment 3 of the present invention.

As shown in FIG. 4 to FIG. 6, this embodiment provides another blade replacement structure, where a fitting manner between a blade 3 and a blade holder 2 is same as that in the foregoing embodiment, and details are not described herein again. Differences between this embodiment and the foregoing embodiment are that a spacer 23 and a second clamp plate 22 in the blade holder 2 are separate structures; the spacer 23 is connected to the second clamp plate 22 by a connection pin; and a first end of a first elastic member 221 is integrally formed with the second clamp plate 22. Compared with the spacer 23 and the second clamp plate 22 that are integrally formed in the foregoing embodiment, regarding the separate structures in this embodiment, on a premise of ensuring that the connection between the blade holder 2 and the blade 3 has sufficient strength, the thickness of the blade holder 2 can be made thinner, thereby saving materials and reducing costs. The blade holder is more suitable for assembling small-sized blades, such as small-sized blades for fruits. Compared with Embodiment 1, the structure in which the first elastic member 221 and the second clamp plate 22 are integrally formed reduces complexity of the structure and can reduce production costs. Optionally, a curved portion is disposed at the first end of the first elastic member 221; and relative to the second clamp plate, a second end of the first elastic member 221 is lifted towards a direction of the blade. To ensure the strength of the blade holder, the thickness of the first clamp plate cannot be made too thin. The first elastic member integrally formed with the second clamp plate is provided with a curved portion at the first end, thereby improving elasticity of the first elastic member. In this way, a technical problem that elasticity of the first elastic member is insufficient due to excessively high hardness can be resolved.

Optionally, another edge of the first elastic member 221 is separated from the second clamp plate by a slot penetrating the second clamp plate 22. In this embodiment, after the first elastic member 221 is separated from the second clamp plate 22, the first elastic member 221 can obtain a larger working stroke, that is, has a larger range of moving up and down. The larger working stroke enables the first elastic member 221 to adapt to more blades 3 with different thicknesses, thereby improving structural adaptability.

Optionally, a front end face of a first locking protrusion 231 is configured to be an arc-shaped end face; the back portion of the blade 3 is provided with an avoidance opening for accommodating a corresponding portion of the spacer 23, and a shape of an edge of the avoidance opening of the blade 3 is configured to fit with a shape of an outer edge of said corresponding portion of the spacer. One may see clear that the first slot 31 is/forms a portion of the avoidance opening. In this embodiment, a contact area between the spacer 23 and the blade 3 is improved by means that the front end surface of the first locking protrusion 231 in contact with the blade 3 is configured to be an arc-shaped end face. In this way, force to which the blade 3 is subjected is more stable during use, and a possibility of displacement of the blade 3 after being subjected to the force is reduced.

Embodiment 3

As shown in FIG. 7 to FIG. 10, this embodiment provides a folding knife containing a blade replacement structure, including a handle body 1 and the blade replacement structure according to any one of the foregoing embodiments. A side of the blade holder 2 away from the blade tip is provided with a connection hole 26. The handle body 1 is pivotally connected to the blade holder 2 by the connection pin 4. The handle body 1 is provided with an accommodation slot 12. In this embodiment, the blade 3 and the blade holder 2 rotate around the connection pin 4 to be opened or closed. The accommodation slot 12 of the handle body 1 is configured to accommodate the blade 3 and the blade holder 2 into the slot when the blade is folded, thereby preventing a user from being cut by a blade edge.

Optionally, the handle body 1 is provided with a limiting pin 11 at a position that is on a side opposite to the knife-edge portion and close to the connection pin 4. An edge of a side that is of the blade holder 2 and is away from the blade tip is provided with a first limiting slot 27 and a second limiting slot 28. The first limiting slot 27 abuts against the limiting pin 11 when the blade is completely opened. The second limiting slot 28 abuts against the limiting pin 11 when the blade is completely closed. In this embodiment, the first limiting slot 27 fits with the limiting pin 11 to limit an opening angle of the blade 3, and meanwhile ensure that the blade can remain stable when the blade is opened under external force. The second limiting slot 28 fits with the limiting pin 11 to limit a closing angle of the blade 3, and meanwhile avoid dangers caused by that the blade 3 is displaced due to external force when the blade 3 is closed. In this way, operation safety is improved.

Optionally, a second elastic member is disposed at a position on a slot wall at one side of the accommodation slot. When the blade holder 2 is at a position at which the same is completely opened, a side of the second elastic member close to the blade tip abuts against a rear edge of the blade holder 2. The second elastic member is configured to abut against the rear edge of the blade holder 2, to ensure that when a back portion of the blade 3 is subjected to external force during use, the blade 3 and the blade holder 2 would not be folded back to the accommodation slot in the blade holder 1 under an action of the force. In this way, an operator who is holding the knife would not be injured.

The foregoing implementations of the present invention do not constitute any limitation on the protection scope of the present invention. Any modification, equivalent replacement, improvement, and the like made within the spirit and principles of the present invention shall fall within the protection scope of the claims of the present invention.

What is claimed is:

1. A blade replacement structure, comprising a blade (3) and a blade holder (2), wherein the blade holder (2) comprises a first clamp plate (21), a second clamp plate (22), a spacer (23), and a first elastic member (221);

wherein the spacer (23) is fixedly disposed on the second clamp plate (22); the first plate (21) engages the second clamp plate (22) so that the spacer (23) is positioned between the first clamp plate (21) and the second clamp plate (22); the first clamp plate (21), the second clamp plate (22), and the spacer (23) together enclose a blade embedding slot (24) that allows the blade (3) to be inserted;

wherein the blade (3) has a knife-edge portion and a back portion opposite to the knife-edge portion;

wherein a front portion of the spacer (23) is provided with a first locking protrusion (231); the back side of the blade (3) opposite to a knife-edge portion is provided with a first slot (31) that fits with the first locking protrusion (231); a rear portion of the spacer (23) is provided with a lower limiting wall (232); the lower limiting wall (232) abuts against a rear portion of the blade (3); the spacer (23) is provided with an avoidance slot at a position corresponding to the first elastic member (221), with the first elastic member (221) being received in the avoidance slot; the first elastic member (221) comprises a first end and a second end; the first end of the first elastic member (221) is fixedly connected to the second clamp plate (22); the second end is located in the blade embedding slot (24) when the first elastic member (221) is in a natural state; the second end is fixedly connected with a press-mode switch (25); a side of the first elastic member (221) facing the knife-edge portion is provided with a second locking protrusion (222); and the back portion of the blade (3) that is away from the blade tip is provided with a second slot (32) that fits with the second locking protrusion (222);

wherein a recess (H) is formed in the second clamp plate (22), at a position corresponding to the second locking protrusion (222); the recess (H) is in communication with the avoidance slot so as to provide a space for receiving the second locking protrusion (222);

when the blade (3) is completely inserted into the blade embedding slot (24), a fitting between the first locking protrusion (231) and the first slot (31) restricts a front portion of the blade (3) from moving up and down; the lower limiting wall (232) provided at a rear portion of the blade embedding slot (24) restricts a rear portion of the blade (3) from moving up and down; the second locking protrusion (222) is latched within the second slot (32) under elastic force of the first elastic member (221) so that the blade (3) cannot move back and forth;

when a replacement of the blade (3) is desired, the press-mode switch (25) is pushed downwardly, so that the second locking protrusion (222) correspondingly moves downwardly, disengages from the second slot (32) and gets into the recess (H), such that the blade (3) may be drawn out along front direction.

2. The blade replacement structure according to claim 1, wherein the spacer (23) is integrally formed with the second clamp plate (22); and the first end of the first elastic member (221) is fixedly connected to the second clamp plate (22) by a connection pin (223).

3. The blade replacement structure according to claim 1, wherein the press-mode switch (25) is cylinder shaped; the first clamp plate (21) is provided with an avoidance hole (211) at a position corresponding to the press-mode switch (25); and the press-mode switch (25) extends through the avoidance hole (211) to outside of the first clamp plate (21).

4. The blade replacement structure according to claim 1, wherein a front face of the first locking protrusion (231) is configured to be an arc-shaped end face; the back portion of the blade (3) is provided with an avoidance opening for accommodating a corresponding portion of the spacer (23), and a shape of an edge of the avoidance opening is configured to fit with a shape of an outer edge of the corresponding portion of the spacer (23); wherein the first slot (31) forms a portion of the avoidance opening.

* * * * *